(No Model.)
J. W. BARTLETT.
CULTIVATOR SHOVEL.
No. 525,310. Patented Aug. 28, 1894.
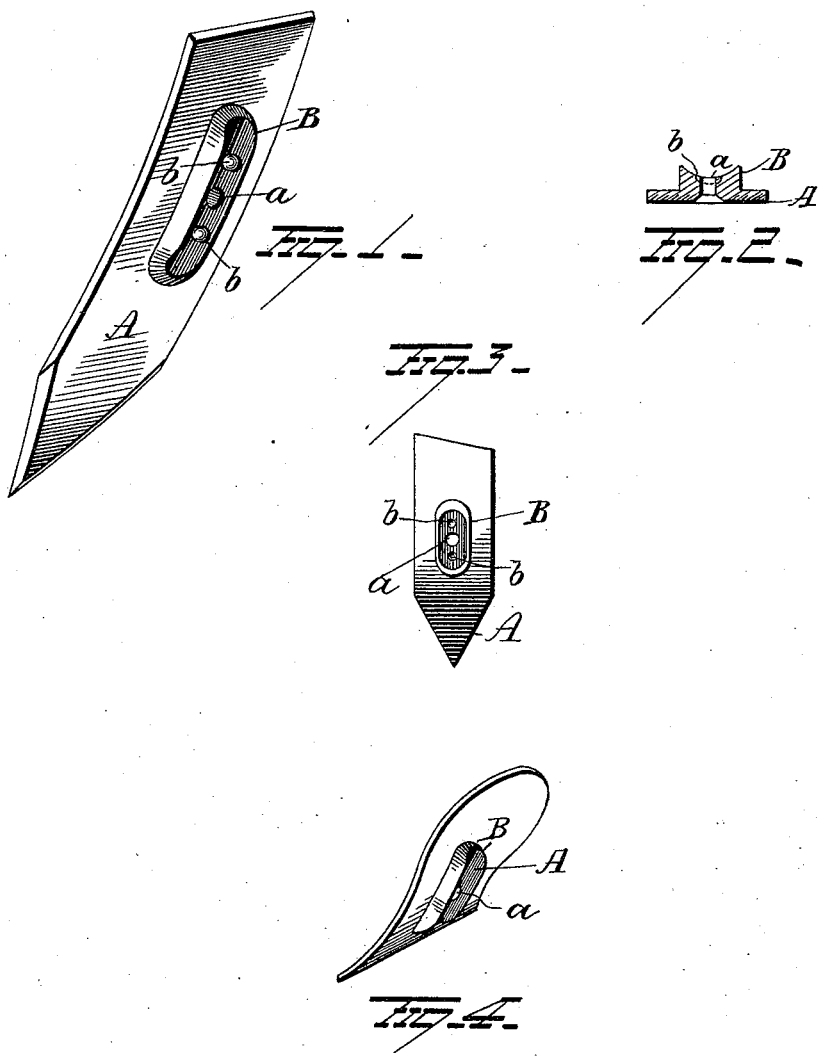
Witnesses
E. J. Nottingham
G. F. Downing
Inventor
John W. Bartlett
By H. A. Seymour
Attorney

UNITED STATES PATENT OFFICE.

JOHN W. BARTLETT, OF MOLINE, ILLINOIS, ASSIGNOR OF ONE-HALF TO CHARLES GRANT, OF SAME PLACE.

CULTIVATOR-SHOVEL.

SPECIFICATION forming part of Letters Patent No. 525,310, dated August 28, 1894.

Application filed April 25, 1891. Serial No. 390,433. (No model.)

*To all whom it may concern:*

Be it known that I, JOHN W. BARTLETT, a citizen of the United States, residing at Moline, in the county of Rock Island and State of Illinois, have invented certain new and useful Improvements in Cultivator-Shovels; and I do hereby declare the following to be a full, clear, and exact description of the invention, such as will enable others skilled in the art to which it appertains to make and use the same.

My invention relates to an improvement in cultivator shovels or teeth made by metal chilled or otherwise hardened on its outer face, and provided on its rear or softer face with an elongated block of soft metal integral with said rear face, the said block being grooved lengthwise, the groove having a depression or depressions therein, and the block and tooth having a hole or opening for the passage of devices for securing it in place.

In the accompanying drawings: Figure 1 is a rear face view of a cultivator shovel or tooth embodying my improvements. Fig. 2 is a sectional view of the same. Figs. 3 and 4 are views of other forms of shovels or teeth to which my improvements are applicable.

A represents an iron cultivator shovel or tooth, which may be formed as illustrated in Figs. 1, 3 and 4 or in any other desired form. The shovel A is chilled or otherwise hardened on its front face, to constitute said front face a hard and durable wearing surface, and the rear face of said shovel is left soft, corresponding in hardness with cast iron. This is done by taking two different grades of pig iron and mixing it in certain proportions and melting it in a cupola. This molten material is then poured into the molds which are prepared with a chemical mixture on one side of the mold to harden the metal on the face side of the shovel about one eighth of an inch deep. In this manner the back of the shovel is made soft to receive the other parts for the attachment of the shovel to the plow frame or body.

Cast on the back of the shovel A, is an elongated block B of soft metal, and is made concave from end to end. The block B is provided at its center with a perforation $a$, adapted to align with a similar perforation in the shovel, through which a bolt may be passed whereby to secure the shovel to the cultivator stock. These blocks B may also be provided with sockets or depressions $b$, adapted to receive corresponding projections on the stock. By thus producing a cultivator shovel or tooth, it may be produced at about one-fourth the cost usually incurred, and from actual experiment shovels so made are found to be very durable and efficient in the performance of the functions for which they are intended.

Having fully described my invention, what I claim as new, and desire to secure by Letters Patent, is—

A tooth or similar article for plows or cultivators made by metal chilled or otherwise hardened on its outer face, and provided on its rear or softer face with an elongated block of soft metal integral with said rear face, the said block being grooved lengthwise, the groove having a depression or depressions therein, and the block and tooth having a hole or opening for the passage of devices for securing it in place, substantially as set forth.

In testimony whereof I have signed this specification in the presence of two subscribing witnesses.

JOHN W. BARTLETT.

Witnesses:
   W. J. ENTRIKIN,
   JULIA IDA DECKER.